UNITED STATES PATENT OFFICE.

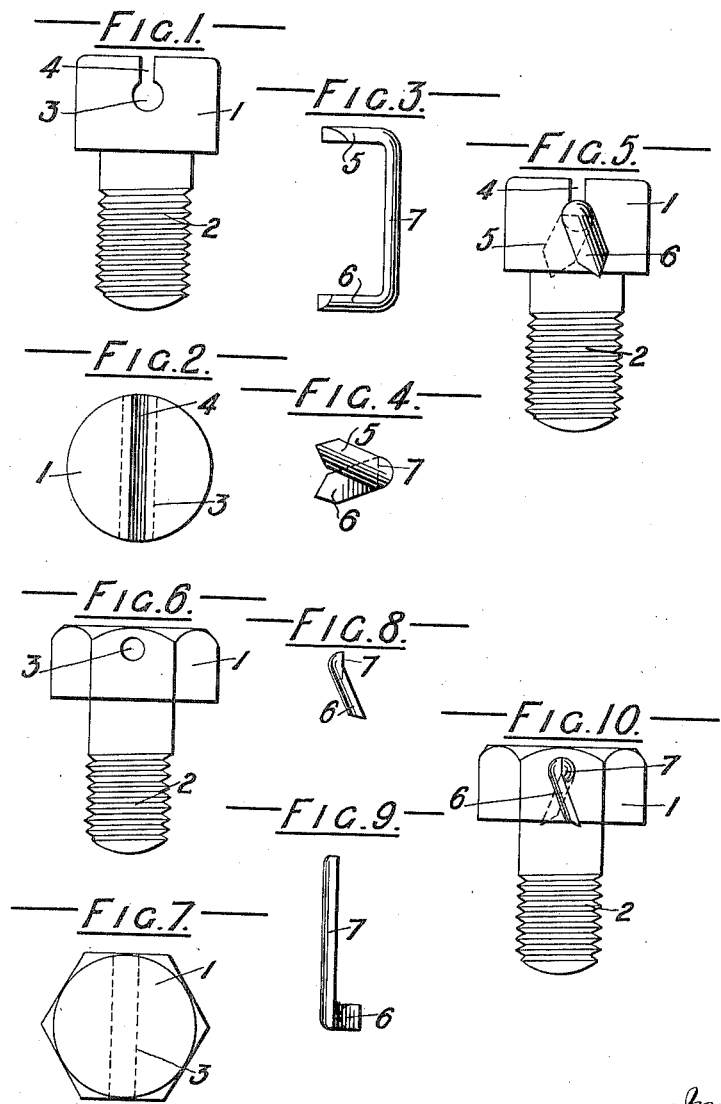

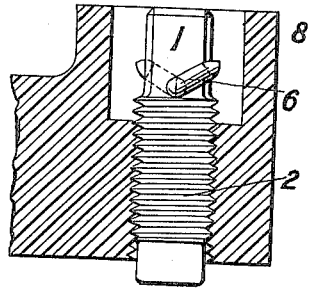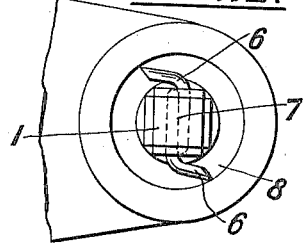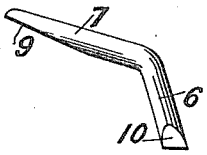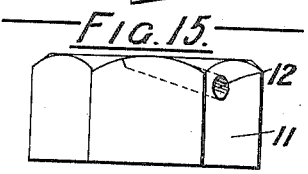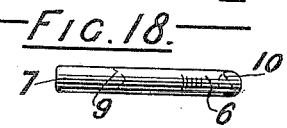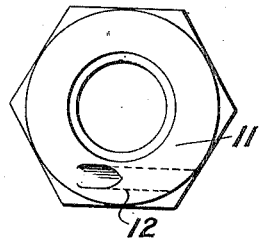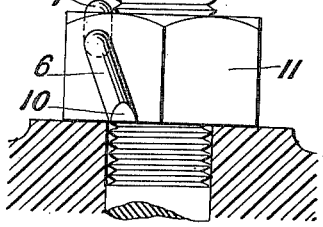

CHARLES HENRY DEWETT AND WALTER JAMES GRIFFITHS, OF LONDON, ENGLAND.

LOCKING DEVICE FOR SCREWS AND NUTS.

No. 821,471.      Specification of Letters Patent.      Patented May 22, 1906.

Application filed September 9, 1905. Serial No. 277,649.

*To all whom it may concern:*

Be it known that we, CHARLES HENRY DEWETT and WALTER JAMES GRIFFITHS, subjects of the King of Great Britain, residing at London, England, have invented certain new and useful Improvements in Locking Devices for Screws and Nuts, of which the following is a specification.

This invention refers to locking devices for holding and retaining screws or nuts against becoming unscrewed or loosened: and to this end we employ a member to be turned having a hole therein at about right angles to the axis thereof, a locking-piece composed of a shank adapted to be inserted in the hole in the said member and a bent gripping portion adapted to be forced into contact with the surface of the part to which the said member is to be secured, as will be hereinafter more particularly described.

According to one construction of our invention the head of a screw is made with a hole from side to side near the top of the said head, and from the said top surface of the screw-head a slot is made equal in width to about half the diameter of the hole and extending entirely across the head, the slot communicating with the hole. The locking-piece is then made of, say, drawn-steel wire— say of a half-round section, the lesser thickness of which section being such that it will pass through the slot in the head, and then it can be turned round in the hole. Both ends of this locking-piece are bent downward, the said bent ends being at different angles, the straight part being equal to the distance across the head of the screw, and the convex side of the straight part forms the upper surface, while the bent parts extend downwardly with their points slightly below the lower face of the screw-head. This locking-piece is tempered, and when the screw is screwed up the chisel-like edges come into contact with a surface of the part into which the screw is inserted and becomes slightly splayed out, producing a torsional stress in the straight part of the locking-piece, and thus causing the chisel edges to be pressed hard against the surface into which the screw is inserted. Thus one bent part of the shank engaging at an opposite angle with the surface receiving the screw prevents the axial rotation of the straight portion of the shank which would be brought about by the pressure of the bent gripping end acting on the receiving-surface, and obviously in this construction that end of the shank which prevents its axial rotation can be formed with a cutting edge to constitute an auxiliary grip upon the said surface. The screw is thus locked, and any tendency to work back causes the chisel edges to cut into the surface of the part receiving the screw, and thereby prevents the screw working back.

Instead of forming the locking member in one piece we may form the same in two pieces, each of a half-round or equivalent section and each with one end downwardly bent and pointed or formed with a chisel end. The straight portions of those two parts are then inserted from opposite sides into a hole made through the head of the screw, and when the screw is tightened down the bent ends are dragged along the face on which the head bears, while the half-round straight parts, tending to turn in opposite directions, produce torsional stress and force the chisel or pointed ends against the surface into which the screw is inserted.

In some cases we may form a hole in, for instance, a hexagonal nut extending from one flat face, and within such a hole we may form a flat surface in the material of the nut, and then the locking-piece may have its shank which is to be inserted in the hole also formed with a flat surface, so that it cannot turn therein, while the bent part of the locking-piece is formed with a pointed or chisel end, as described, to engage the surface onto which the nut screws, thereby producing torsional stress in the locking-piece and effectually locking the said nut.

In order that our invention may be readily understood, we have illustrated several examples of construction in the accompanying drawings, to which reference will now be made.

Figures 1 to 5 illustrate the construction of the invention first herein stated, Fig. 1 being an elevation, and Fig. 2 a plan view, showing a cheese-headed screw formed with a hole and slot extending through and across the head. Fig. 3 is a side elevation, and Fig. 4 an end view, of the locking-piece; and Fig. 5 shows the screw with the locking-piece in place. Figs. 6 to 10 illustrate the construction in which the locking-piece is composed of two parts, Figs. 6 and 7 showing the hexagonal-headed screw in elevation and plan. Fig. 8 is an end elevation, and Fig. 9 a plan, of one of the two similar parts composing the locking-piece; and Fig. 10 shows the same hexagonal-headed bolt with the compound locking-piece *in situ*. A construction of the invention suitable for locking a set-screw in a recessed hole is shown at Figs. 11 to 14, Fig. 11 showing such a screw in elevation, and Fig. 12 in plan, with the locking device applied and the metal receiving the screw in section, Fig. 13 being an end elevation, and Fig. 14 a plan view, of one of the members composing the compound locking device as shown applied at Figs. 11 and 12. Fig. 15 to 19 illustrate an application of the locking device to a nut, Fig. 15 being an elevation, and Fig. 16 a plan, of the nut, showing the hole for receiving the shank of the locking-piece, Fig. 17 an elevation and Fig. 18 a plan, of the locking-piece detached, and Fig. 19 an elevation of a nut with the locking-piece applied.

Referring to Figs. 1 to 5 of the drawings, the head 1 of the screw 2 is formed with a hole 3, extending entirely through the head, and the slot 4, in width equal to about half the diameter of the hole, is cut across the head extending down into the hole 3.

The locking-piece shown at Figs. 3 and 4 is made of half-round section and preferably of drawn-steel wire, the smaller width of this section being such that it can be passed through the slot 4 into the hole and can then be turned therein. The ends 5 6 of this locking-piece are bent, leaving the straight part 7, or, as we will term it, the "shank-piece," equal in length to the distance across the head of the screw, while the bent ends 5 6 are at slightly differing angles to each other—that is, inclining slightly in opposite directions— the terminals of the said bent parts being ground off to form points or chisel edges, in a manner, for instance, resembling the edges of crosscut-chisels. Such a locking-piece having such bent ends can, as will be well understood, be readily inserted through the slot into the hole 3, and when turned so that the rounded surface of the shank is uppermost the bent ends 5 6 will be pointed downward in slightly opposite directions, and those ends are so proportioned that their terminals extend somewhat below the under surface of the head 1, as is shown at Fig. 5. As the screw is tightened down the terminal ends of the bent parts 5 6 are brought to bear upon the surface against which the head is screwed, and the torsional stress set up in the shank 7 by the forcible splaying apart of the bent ends causes their chisel or pointed terminals to press hard against the said surface, whereby the screw is locked, any tendency to work back causing the chisel ends to press into the face and prevent the screw from turning.

Screws locked as described are not readily taken out again, and this arrangement is well suited for screws which are not likely to require removal. Special means are not proposed for removing the said screws so locked; but the breaking of the locking-piece with a hammer and chisel is considered the best method when removal becomes necessary.

At Figs. 6 to 10 is shown the application of a compound locking-piece—that is, a locking-piece composed of two parts—and is illustrated as applied to a hexagonal-headed screw. The screw 2 is here shown with a hole 3 drilled through its hexagonal head 1 near the top—say from one facet to the opposite facet. The compound locking-piece is, as aforesaid, composed of two similar parts, and one of such parts, which is illustrated at Figs. 8 and 9, is formed of half-round metal having a straight shank 7 and one bent end 6, the terminal of which is finished with a chisel or equivalent point. The shank 7 of one of the locking parts is inserted into the hole 3 of the screw-head, and the shank of the other locking part is inserted from the opposite side to that of the first into the same hole 3, and the bent end of each of these parts extends downward, as shown at Fig. 10, so that the points would bear upon the surface onto which the head is brought when the screw is tightened up, the chisel or pointed ends being dragged along the said surface, the points being thereby splayed apart and producing a torsional stress in the shanks by the said half-round shanks tending to turn in opposite directions. When it is necessary to remove a screw locked in this manner, one of the shanks can be pulled or forced out of the hole in the head and the other is thereby released.

Referring to Figs. 11 to 14, which show the locking of a set-screw, the construction illustrated is practically the same as has been described with reference to Figs. 6 to 10, excepting that the bent ends of the compound locking-piece are arranged to act against the side of the recess of the part into which the set-screw is inserted. When the set-screw has to be withdrawn, the locking-wires must be broken, since they cannot be withdrawn from the hole which is drilled through the set-screw.

A convenient application of the invention to a nut for a bolt is shown at Figs. 16 to 19, where the locking-piece is composed of a single member consisting of a shank 7 and a bent part 6. The locking-piece, as shown at Figs. 17 and 18, is made of circular section-wire, and the shank 7 in order to prevent axial rotation is formed at its end with a flat portion 9 and a point or chisel edge 10 at the end of the bent part 6.

In one of the flats of the nut 11 a hole 12 is drilled, starting near the top of the nut and inclining toward the upper face of the same. This hole is drilled until the drill begins to break through the top face of the nut, and then the drill is withdrawn and a half-round punch or drift is driven into the hole and completes it by forming a small flat at the end of the hole. Obviously any suitable means preferred may be employed in forming this hole, it being essential at all events that a flat should be formed therein or some other formation should be adopted for preventing the shank 7 of the locking-piece from revolving about its axis when inserted into this hole. In the construction shown the shank 7, Fig. 17, of the locking-piece is inserted into the hole 12, and the flat 9 will engage with the flat surface formed in the nut within the hole, and thereby prevent the shank 7 turning about its axis.

The part 6 of the locking-piece that will be outside the hole will then engage with its pointed end upon the surface with which the under face of the nut is brought into contact, and the said nut will be then prevented from unscrewing.

Obviously a construction similar to that described at Figs. 15 to 19 can be used for locking screws, and any arrangements suitable for screws can when desired be used for preventing nuts or bolt-heads from turning.

Instead of the half-round section for the locking-piece any suitable flattened section may be used.

What we claim as our invention, and desire to secure by Letters Patent, is—

1. In a device for holding screws and nuts against becoming unscrewed, the combination with a member to be turned, having a hole therein at about right angles to the axis thereof, of a locking-piece comprising a shank adapted to be inserted in the hole in the said member and a bent gripping portion adapted to be forced into contact with the surface of the part to which the said member is to be screwed.

2. In devices for holding screws and nuts against becoming unscrewed; the combination with a screw having a hole extending entirely through the same at about right angles to the axis; of a steel-wire locking-piece composed of a shank and two bent end gripping portions, means for inserting the shank in said hole in the screw, the bent end gripping portions being inclined at opposite angles, the extremities of the bent gripping portions being both forced into gripping contact with the aforesaid surface, the pressure of the extremities of the bent portions upon the surface of the part receiving the said screw being maintained by torsion set up in the shank substantially as set forth.

3. In devices for holding screws and nuts against becoming unscrewed; the combination with a screw having a hole extending entirely through the same; of a steel-wire locking-piece, composed of a shank and two bent end portions, said shank being located in said hole, the bent end portions being turned downward toward the surface of the part receiving the nut or screw, and being inclined at opposite angles to the vertical, the extremities of the bent gripping portions being both forced into gripping contact with the aforesaid surface of the part receiving said screw, the pressure of said gripping portions being maintained on the said surface by the torsion set up in the shank, substantially as set forth.

4. In devices for holding screws and nuts against becoming unscrewed; the combination with a screw having a hole extending entirely through the same and having a slot cut across and extending down into the hole; of a steel-wire locking-piece of half-round section, composed of a shank and two bent end portions, said shank being inserted in said hole through said slot in the screw, the bent ends being turned downward toward the surface of the part receiving the screw, and being inclined at opposite angles to the vertical, the extremities of the bent gripping portions being both forced into contact with the surface of the part receiving the said screw, the pressure of said bent gripping portions being maintained on said surface by the torsion set up in said shank, substantially as set forth.

5. In a device for holding screws and nuts against becoming unscrewed, the combination with a member to be turned, having a hole therein at about right angles to the axis thereof, of a locking-piece comprising a shank adapted to be inserted in the hole in the said member, a bent gripping portion adapted to be forced into contact with the surface of the part to which the said member is to be screwed and means for preventing said shank member from turning.

CHARLES HENRY DEWETT.
WALTER JAMES GRIFFITHS.

Witnesses:
HENRY WALTER GRAYDON,
H. HELSON.